United States Patent
Luke et al.

(10) Patent No.: US 8,825,250 B2
(45) Date of Patent: Sep. 2, 2014

(54) DETECTIBLE INDICATION OF AN ELECTRIC MOTOR VEHICLE STANDBY MODE

(71) Applicant: Gogoro, Inc., New Taipei (TW)

(72) Inventors: Hok-Sum Horace Luke, Mercer Island, WA (US); Matthew Whiting Taylor, North Bend, WA (US)

(73) Assignee: Gogoro, Inc., New Taipei (TW)

( * ) Notice: Subject to any disclaimer, the term of this patent is extended or adjusted under 35 U.S.C. 154(b) by 0 days.

(21) Appl. No.: 13/646,320

(22) Filed: Oct. 5, 2012

(65) Prior Publication Data

US 2013/0090795 A1    Apr. 11, 2013

Related U.S. Application Data

(63) Continuation of application No. 13/559,314, filed on Jul. 26, 2012, and a continuation of application No.

(Continued)

(51) Int. Cl.
*B60L 15/00* (2006.01)
*B60L 1/00* (2006.01)

(52) U.S. Cl.
USPC .............................. 701/22; 701/36; 180/65.1

(58) Field of Classification Search
USPC ........ 701/22, 36, 29.1, 30.7, 30.8, 30.9, 31.1, 701/102; 180/65.1, 65.21, 65.265, 65.275, 180/65.29

See application file for complete search history.

(56) References Cited

U.S. PATENT DOCUMENTS 3,664,450 A * 5/1972 Udden et al. ................. 180/65.1

3,678,455 A    7/1972 Levey (Continued)

FOREIGN PATENT DOCUMENTS

JP    7-36504 U    7/1995
JP    2005-67453 A    3/2005

(Continued)

OTHER PUBLICATIONS

International Search Report and Written Opinion of the International Searching Authority for International Patent Application No. PCT/US2012/058930, dated Mar. 15, 2013, 11 pages.

(Continued)

*Primary Examiner* — Mary Cheung
*Assistant Examiner* — Rodney Butler
(74) *Attorney, Agent, or Firm* — Seed IP Law Group PLLC (57) ABSTRACT

Systems and methods are provided for detecting that an electric motor drive vehicle (e.g., an electric scooter or motorbike) is idling based on one or more of sensed parameters indicative of the idling state. These sensed parameters may include one or more of, alone or in any combination, a sensed throttle position, at least one sensed electrical characteristic of a traction electric motor, a power converter, or an electrical storage device of the vehicle, and a sensed rate of rotation of a drive shaft of the traction electric motor or of a wheel drivably coupled to the traction electric motor. Upon detecting that the vehicle is in an idling state, a controller of the vehicle enters into a standby mode. In the standby mode, a relatively small amount of electrical power is supplied to the traction electric motor to cause a vibration of the motor to alert a driver that the vehicle is ON in the standby mode and is ready to be driven. Additionally, an audible and/or visual indication may be issued in the standby mode to further alert the driver that the vehicle is ON and ready to be driven.

18 Claims, 4 Drawing Sheets

Related U.S. Application Data

13/559,091, filed on Jul. 26, 2012, and a continuation of application No. 13/559,038, filed on Jul. 26, 2012, and a continuation of application No. 13/559,010, filed on Jul. 26, 2012, and a continuation of application No. 13/559,259, filed on Jul. 26, 2012, and a continuation of application No. 13/559,264, filed on Jul. 26, 2012, and a continuation of application No. 13/559,054, filed on Jul. 26, 2012, now Pat. No. 8,560,147, and a continuation of application No. 13/559,125, filed on Jul. 26, 2012, and a continuation of application No. 13/559,390, filed on Jul. 26, 2012, and a continuation of application No. 13/559,333, filed on Jul. 26, 2012, and a continuation of application No. 13/559,343, filed on Jul. 26, 2012, and a continuation of application No. 13/559,064, filed on Jul. 26, 2012.

(60) Provisional application No. 61/543,720, filed on Oct. 5, 2011, provisional application No. 61/557,170, filed on Nov. 8, 2011, provisional application No. 61/557,176, filed on Nov. 8, 2011, provisional application No. 61/581,566, filed on Dec. 29, 2011, provisional application No. 61/601,404, filed on Feb. 21, 2012, provisional application No. 61/601,949, filed on Feb. 22, 2012, provisional application No. 61/601,953, filed on Feb. 22, 2012, provisional application No. 61/647,936, filed on May 16, 2012, provisional application No. 61/647,941, filed on May 16, 2012, provisional application No. 61/684,432, filed on Aug. 17, 2012.

(56) References Cited

U.S. PATENT DOCUMENTS

| | | | |
|---|---|---|---|
| 6,515,580 B1 | 2/2003 | Isoda et al. | |
| 6,593,713 B2 | 7/2003 | Morimoto et al. | |
| 6,796,396 B2 | 9/2004 | Kamen et al. | |
| 7,567,166 B2 | 7/2009 | Bourgine De Meder | |
| 7,979,147 B1 | 7/2011 | Dunn | |
| 8,118,132 B2 | 2/2012 | Gray, Jr. | |
| 2001/0018903 A1* | 9/2001 | Hirose et al. | 123/179.4 |
| 2002/0023789 A1* | 2/2002 | Morisawa et al. | 180/65.2 |
| 2007/0026996 A1* | 2/2007 | Ayabe et al. | 477/107 |
| 2007/0208468 A1 | 9/2007 | Sankaran et al. | |
| 2010/0026238 A1* | 2/2010 | Suzuki et al. | 320/109 |
| 2010/0051363 A1* | 3/2010 | Inoue et al. | 180/65.26 |
| 2010/0235043 A1* | 9/2010 | Seta et al. | 701/34 |
| 2011/0120789 A1* | 5/2011 | Teraya | 180/65.25 |
| 2011/0292667 A1 | 12/2011 | Meyers | |
| 2011/0295454 A1 | 12/2011 | Meyers | |
| 2012/0000720 A1* | 1/2012 | Honda et al. | 180/65.1 |
| 2012/0105078 A1* | 5/2012 | Kikuchi et al. | 324/654 |
| 2012/0123661 A1* | 5/2012 | Gray, Jr. | 701/99 |
| 2012/0126969 A1* | 5/2012 | Wilbur et al. | 340/466 |
| 2013/0026971 A1 | 1/2013 | Luke et al. | |
| 2013/0026972 A1 | 1/2013 | Luke et al. | |
| 2013/0026973 A1 | 1/2013 | Luke et al. | |
| 2013/0027183 A1 | 1/2013 | Wu et al. | |
| 2013/0030580 A1 | 1/2013 | Luke et al. | |
| 2013/0030581 A1 | 1/2013 | Luke et al. | |
| 2013/0030608 A1 | 1/2013 | Taylor et al. | |
| 2013/0030630 A1 | 1/2013 | Luke et al. | |
| 2013/0030696 A1 | 1/2013 | Wu et al. | |
| 2013/0030920 A1 | 1/2013 | Wu et al. | |
| 2013/0031318 A1 | 1/2013 | Chen et al. | |
| 2013/0033203 A1 | 2/2013 | Luke et al. | |
| 2013/0093271 A1 | 4/2013 | Luke et al. | |
| 2013/0093368 A1 | 4/2013 | Luke et al. | |
| 2013/0116892 A1 | 5/2013 | Wu et al. | |
| 2013/0119898 A1* | 5/2013 | Ohkura | 318/139 |

FOREIGN PATENT DOCUMENTS

| | | |
|---|---|---|
| KR | 1998-045020 U | 9/1998 |
| KR | 10-2004-005146 A | 1/2004 |
| KR | 10-0971278 B1 | 7/2010 |

OTHER PUBLICATIONS

Chen et al., "Apparatus, Method and Article for Providing Vehicle Diagnostic Data," U.S. Appl. No. 61/601,404, filed Feb. 21, 2012, 56 pages.

Luke et al., "Apparatus, Method and Article for Authentication, Security and Control of Power Storage Devices, Such as Batteries, Based on User Profiles," U.S. Appl. No. 61/534,772, filed Sep. 14, 2011, 55 pages.

Luke et al., "Apparatus, Method and Article for Authentication, Security and Control of Power Storage Devices, Such as Batteries," U.S. Appl. No. 61/534,761, filed Sep. 14, 2011, 55 pages.

Luke et al., "Apparatus, Method and Article for Collection, Charging and Distributing Power Storage Device, Such as Batteries," U.S. Appl. No. 61/511,900, filed Jul. 26, 2011, 73 pages.

Luke et al., "Apparatus, Method and Article for Collection, Charging and Distributing Power Storage Devices, Such as Batteries," U.S. Appl. No. 61/647,936, filed May 16, 2012, 76 pages.

Luke et al., "Apparatus, Method and Article for Redistributing Power Storage Devices, Such as Batteries, Between Collection, Charging and Distribution Machines," U.S. Appl. No. 61/534,753, filed Sep. 14, 2011, 65 pages.

Luke et al., "Dynamically Limiting Vehicle Operation for Best Effort Economy," U.S. Appl. No. 61/511,880, filed Jul. 26, 2011, 52 pages.

Luke et al., "Improved Drive Assembly for Electric Device," U.S. Appl. No. 13/650,392, filed Oct. 12, 2012, 43 pages.

Luke et al., "Thermal Management of Components in Electric Motor Drive Vehicles," U.S. Appl. No. 61/511,887, filed Jul. 26, 2011, 44 pages.

Luke et al., "Thermal Management of Components in Electric Motor Drive Vehicles," U.S. Appl. No. 61/647,941, filed May 16, 2012, 47 pages.

Taylor et al., "Apparatus, Method and Article for Physical Security of Power Storage Devices in Vehicles," U.S. Appl. No. 61/557,170, filed Nov. 8, 2011, 60 pages.

Wu et al., "Apparatus, Method and Article for a Power Storage Device Compartment," U.S. Appl. No. 61/581,566, filed Dec. 29, 2011, 61 pages.

Wu et al., "Apparatus, Method and Article for Providing Information Regarding Availability of Power Storage Devices at a Power Storage Device Collection, Charging and Distribution Machine," U.S. Appl. No. 61/601,953, filed Feb. 22, 2012, 53 pages.

Wu et al., "Apparatus, Method and Article for Providing Locations of Power Storage Device Collection, Charging and Distribution Machines," U.S. Appl. No. 61/601,949, filed Feb. 22, 2012, 56 pages.

Wu et al., "Apparatus, Method and Article for Security of Vehicles," U.S. Appl. No. 61/557,176, filed Nov. 8, 2011, 37 pages.

* cited by examiner

DETECTIBLE INDICATION OF AN ELECTRIC MOTOR VEHICLE STANDBY MODE

BACKGROUND

1. Technical Field

The present disclosure relates generally to vehicles which employ electric motors as the prime mover or traction motor and, in particular, to providing a detectible indication that a vehicle is powered on and ready to be driven.

2. Description of the Related Art

Hybrid and all electrical vehicles are becoming increasingly common. Such vehicles may achieve a number of advantages over traditional internal combustion engine vehicles. For example, hybrid or electrical vehicles may achieve higher fuel economy and may have little or even zero tail pipe pollution. In particular, all electric vehicles may not only have zero tail pipe pollution, but may be associated with lower overall pollution. For example, electrical power may be generated from renewable sources (e.g., solar, hydro). Also for example, electrical power may be generated at generation plants that produce no air pollution (e.g., nuclear plants). Also for example, electrical power may be generated at generation plants that burn relatively "clean burning" fuels (e.g., natural gas), which have higher efficiency than internal combustion engines, and/or which employ pollution control or removal systems (e.g., industrial air scrubbers).

Personal transportation vehicles such as combustion engine powered scooters and/or motorbikes are ubiquitous in many places, for example in the many large cities of Asia. Such scooters and/or motorbikes tend to be relatively inexpensive, particularly as compared to automobiles, cars or trucks. Cities with high numbers of combustion engine scooters and/or motorbikes also tend to be very densely populated and suffer from high levels of air pollution. Many newer combustion engine scooters and/or motorbikes are considered to be relatively low polluting sources of personal transportation. For instance, such scooters and/or motorbikes may have higher mileage ratings than larger vehicles. Some scooters and/or motorbikes may even be equipped with basic pollution control equipment (e.g., catalytic converter). Unfortunately, factory specified levels of emission are quickly exceeded as the scooters and/or motorbikes are used and either not maintained and/or as the scooters and/or motorbikes are modified, for example, by intentional or unintentional removal of catalytic converters. Often owners or operators of scooters and/or motorbikes lack the financial resources or the motivation to maintain their vehicles.

It is known that air pollution has a negative effect on human health, being associated with causing or exacerbating various diseases (e.g., numerous reports tie air pollution to emphysema, asthma, pneumonia, and cystic fibrosis, as well as various cardiovascular diseases). Such diseases take large numbers of lives and severely reduce the quality of life of countless others.

BRIEF SUMMARY

Zero tail pipe emission alternatives to combustion engines would greatly benefit the air quality, and hence health of large populations.

While the zero tail pipe emissions benefit of all-electric vehicles are appreciated, adoption of all-electric vehicles by large populations has been slow. One of the reasons appears to be related to the safety of electric vehicles. One particular safety issue arises from the fact that it is often difficult for a driver (user) to ascertain whether an electric vehicle is OFF, ON and being driven (hereinafter "in a drive mode"), or ON but idling (not in motion) and merely ready to be driven (hereinafter "in a standby mode"). Unlike a traditional combustion engine that causes a vehicle to vibrate when the vehicle is turned on (i.e., when the engine is turned on) giving the driver an indication that the vehicle is ready to be driven, an electric vehicle does not provide a clear indication that it is ready to be driven when the vehicle is powered ON. In other words, an electric vehicle does not differ in the way the vehicle "feels" to the driver between when it is OFF and when it is ON but in the standby mode where the vehicle is idling and is ready to be driven. As a result, if the driver mistakenly believes that the vehicle is OFF when in fact it is ON and in the standby mode (ready to be driven), even a simple operator error may lead to a serious accident involving injuries to people and properties.

The approaches described herein may address these safety issues that may have limited adaptation of zero tailpipe emission technology, particularly in densely crowded cities.

For example, some of the approaches described herein employ systems and methods for detecting that an electric motor drive vehicle (e.g., an electric scooter or motorbike) is in an idling state based on one or more sensed parameters indicative of the idling state. These sensed parameters may include one or more of, alone or in any combination, a sensed throttle position, at least one sensed electrical characteristic of a traction electric motor, a power converter, or an electrical storage device of the vehicle, and a sensed rate of rotation of a drive shaft of the traction electric motor or of a wheel drivably coupled to the traction electric motor, or another wheel of the vehicle. According to various exemplary systems and methods, upon detecting that the vehicle is in an idling state, a controller of the vehicle enters into a standby mode. In the standby mode, a relatively small amount of electrical power is supplied to the traction electric motor to cause a vibration of the motor and hence of the vehicle to alert a driver that the vehicle is in the standby mode and ready to be driven. Additionally, an audible and/or visual indication may be issued in the standby mode to further alert the driver that the vehicle is ON and ready to be driven. In other embodiments, tactile feedback, e.g., vibration of the motor or other portion of the vehicle, and/or audible and/or visual indications can be issued when the vehicle is turned on, but not is not in the standby mode.

A power system for a vehicle according to one embodiment of the present invention may be summarized as including a traction electric motor coupled to drive at least one traction wheel of the vehicle, and an electrical energy storage device to drive the traction electric motor. The power system further includes a control circuit that includes at least one idling state sensor arranged to sense an idling state of the vehicle. The control circuit causes the electric energy storage device to supply a first (relatively small) amount of electric power to the traction electric motor based at least in part on the sensed idling state of the vehicle, so as to create a small vibration detectible to the driver to thereby alert the driver that the vehicle is in the standby mode and is ready to be driven.

The at least one idling state sensor may be any of a throttle position sensor, a rotation sensor coupled to sense a rate of rotation of a drive shaft of the traction electric motor or of at least one traction wheel of the vehicle, a voltage sensor or a current sensor coupled to sense at least one electrical characteristic of the electrical energy storage device, one or more power converters, or the traction electric motor, according to non-limiting embodiments.

The power system may further include a speaker and/or a visual indicator configured to issue audible and/or visual signals (indications) during the standby mode, to further alert the driver that the vehicle is ON and ready to be driven.

In other non-limiting embodiments, the power system may include a vibration device coupled to the control circuit and electrical energy storage device. Upon sensing an idling state of the vehicle, the control circuit causes the electric energy storage device to supply a first amount of electric power to the vibration device based in part on the sensed idling state of the vehicle, so as to create a small vibration detectible to the driver to thereby alert the drive that the vehicle is in the standby mode and is ready to be driven. The idling sensor may also sense more than an idling state of the vehicle, e.g., sense motion of the vehicle. For example, the idling sensor may be any of a throttle sensor configured to sense throttle position, rotation sensor coupled to sense rate or rotation of a drive shaft of the traction electric motor or at least one traction wheel of the vehicle, a voltage sensor or a current sensor coupled to sense at least one electrical characteristic of the electrical energy storage device, one or more power converters, or the traction electric motor, or a motion sensor configured to sense movement of the vehicle or vehicle components, such as at least one traction wheel or a drive mechanism between the traction electric motor and the traction drive wheel.

A method of operating a power system for a vehicle having a traction electric motor according to one embodiment may be summarized as including supplying electrical power from an electrical energy storage device to the traction electric motor of the vehicle in a drive mode; sensing an idling state of the vehicle; switching from the drive mode to a standby mode based at least in part on the sensed idling state of the vehicle; and supplying a first amount of electrical power to the traction electric motor in the standby mode.

In the method, sensing an idling state of the vehicle may include continuously sensing the idling state for a defined period of time, so as to further reliably detect that the vehicle is in the idling state.

The method may further include sensing a power-on state of the vehicle; entering into the drive mode based at least in part on the sensed power-on state of the vehicle; and supplying a second amount of electric power to a speaker based at least in part on the sensed power-on state of the vehicle.

In embodiments of the method for operating a power system for a vehicle having a traction electric motor in accordance with embodiments described herein, electrical power from an electrical energy storage device is supplied to a traction electric motor, movement of the vehicle or vehicle components is sensed, and a first amount of electric power is supplied to the traction electric motor in the standby mode or to a vibration device.

A vehicle according to one embodiment may be summarized as including a traction electric motor coupled to drive at least one wheel of the vehicle; an electrical power storage device that stores power; an idling state sensor positioned and configured to sense an idling state of the vehicle or motion of the vehicle or vehicle components; and a controller that supplies a first amount of electric power from the electrical power storage device to the traction electric motor or vibration device based at least in part on the sensed idling state of the vehicle or sensed movement of the vehicle or vehicle components. The first amount of electric power to be supplied to the traction electric motor or the vibration device may be defined as a first amount of current or voltage.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with electric motor vehicles, batteries, super- or ultracapacitors, and power converters, including but not limited to, transformers, rectifiers, DC/DC power converters, switch mode power converters, controllers, and communications systems, structures and networks have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment.

The use of ordinals such as first, second and third does not necessarily imply a ranked sense of order, but rather may only distinguish between multiple instances of an act, value or structure. For example, first and second amounts may only distinguish between two instances of an amount, which may be the same or different from each other.

Reference to a portable electrical power storage device or electrical energy storage device means any device capable of storing electrical power and releasing stored electrical power including, but not limited to, batteries, super- or ultracapacitors. Reference to batteries means a chemical storage cell or cells, for instance rechargeable or secondary battery cells including but not limited to nickel cadmium alloy or lithium ion battery cells.

The headings and Abstract of the Disclosure provided herein are for convenience only and do not interpret the scope or meaning of the embodiments.

Figure 1:
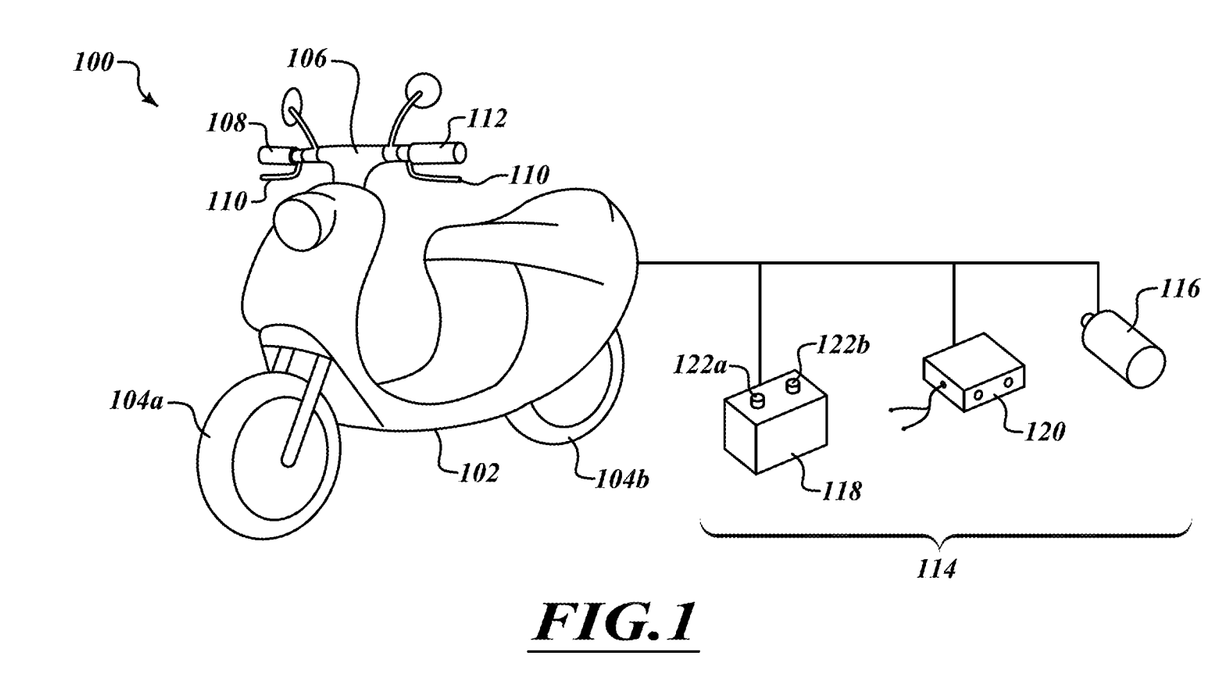
FIG. 1 is an isometric, partially exploded, view of an electric scooter or motorbike which may include the various components or structures described herein, according to one non-limiting illustrated embodiment.

FIG. 1 shows an electrically powered personnel transportation vehicle in the form of an electric scooter or motorbike 100, according to one illustrated embodiment.

As previously noted, combustion engine scooters and motorbikes are common in many large cities, for example in Asia, Europe and the Middle East. The ability to address safety issues of all-electric vehicles may foster the use of all-electric scooters and motorbikes 100 in place of internal combustion engine scooters and motorbikes, thereby alleviating air pollution, as well as reducing noise.

The electric scooter or motorbike 100 includes a frame 102, wheels 104a, 104b (collectively 104), and a handle bar 106 with user controls such as throttle 108, brake levers 110, turn indicators switches 112, etc., all of which may be of conventional design. The electric scooter or motorbike 100 may also include a power system 114, which includes a traction electric motor 116 coupled to drive at least one of the wheels 104, at least one electrical power storage device 118 that stores electrical power to power at least the traction electric motor 116, and control circuit 120 which controls power distribution between at least the electrical power storage device 118 and the traction electric motor 116.

The traction electric motor 116 may take any of a variety of forms, but typically will be a permanent magnet induction motor capable of producing sufficient power (Watts or horsepower) and torque to drive the expected load at desirable speeds and acceleration. The traction electric motor 116 may be any conventional electric motor capable of operating in a drive mode, as well as optionally operating in a regenerative braking mode. In the drive mode, the traction electric motor consumes electrical power, to drive the wheel. In the optional regenerative braking mode, the traction electric motor operates as a generator, producing electric current in response to rotation of the wheel and producing a braking effect to slow a vehicle.

The electrical energy storage devices 118 may take a variety of forms, for example batteries (e.g., array of battery cells) or super- or ultracapacitors (e.g., array of ultracapacitor cells). For example, the electrical energy storage devices 118 may take the form of rechargeable batteries (i.e., secondary cells or batteries). The electrical energy storage devices 118 may, for instance, be sized to physically fit, and electrically power, personal transportation vehicles, such as all-electric scooters or motorbikes 100, and may be portable to allow easy replacement or exchange. Given the likely demand imposed by the transportation application, electrical energy storage devices 118 are likely to take the form of one or more chemical battery cells.

The electrical energy storage devices 118 may include a number of electrical terminals 122a, 122b (two illustrated, collectively 122), accessible from an exterior of the electrical energy storage device 118. The electrical terminals 122 allow a charge to be delivered from the electrical energy storage device 118, as well as allowing a charge to be delivered to the electrical energy storage device 118 for charging or recharging the same. While illustrated in FIG. 1 as posts, the electrical terminals 122 may take any other form which is accessible from an exterior of the electrical energy storage device 118, including electrical terminals positioned within slots in a battery housing.

As better illustrated in FIG. 2 and described below, the control circuit 120 includes various components for issuing a detectible indication(s) to a driver that the electric scooter or motorbike 100 is in the standby mode and is ready to be driven.

Figure 2:
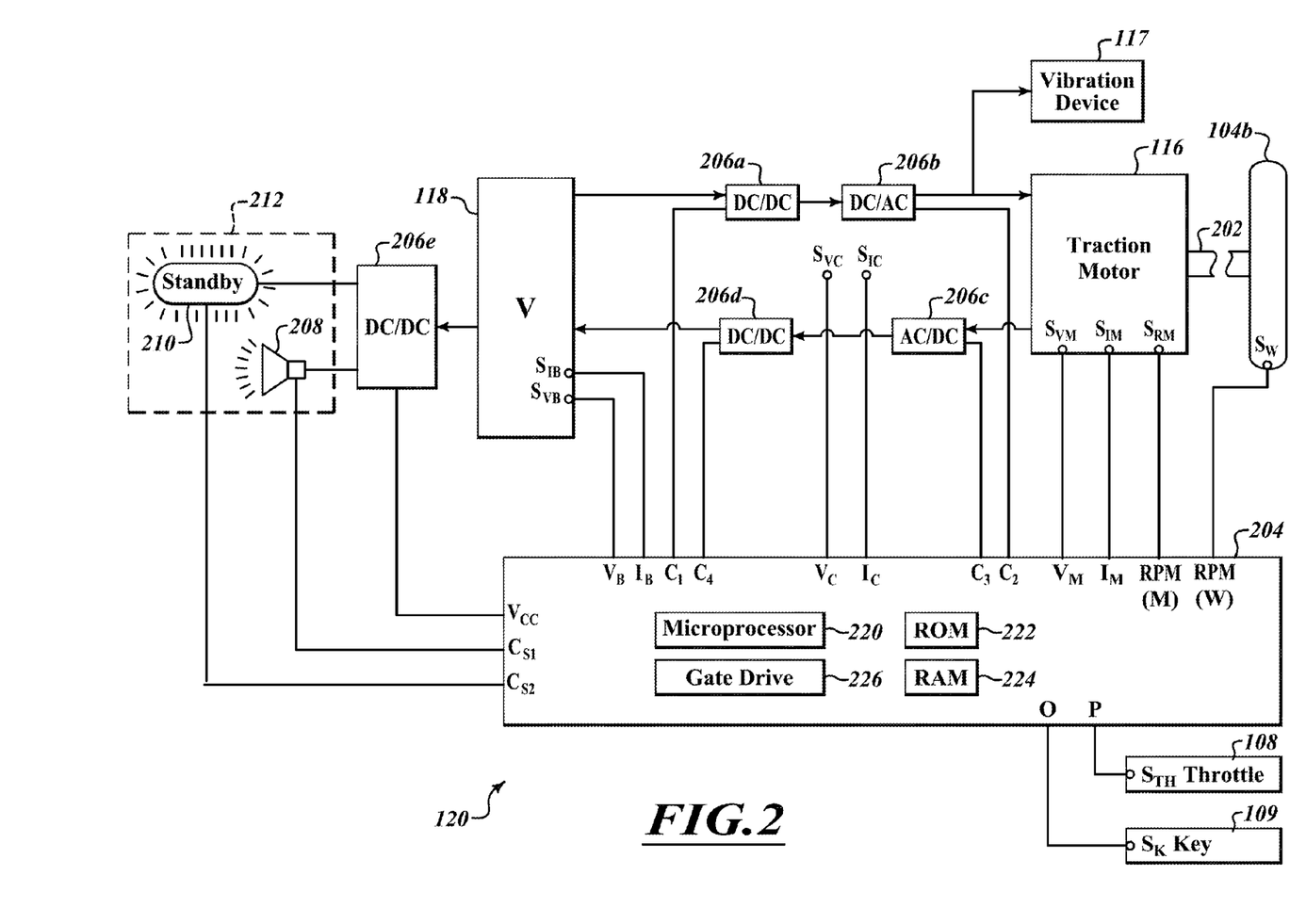
FIG. 2 is a block diagram of some of the components or structures of the scooter or motorbike of FIG. 1, according to one non-limiting illustrated embodiment.

FIG. 2 shows portions of the electric scooter or motorbike 100, according to one illustrated embodiment. In particular, FIG. 2 shows an embodiment which employs the electrical energy storage device 118 to supply power to the traction electric motor 116 during the drive mode and to optionally receive power generated by the traction electric motor 116 during the regenerative braking mode. In accordance with various exemplary embodiments, the electrical energy storage device 118 further supplies power to the traction electric motor 116 during the "standby" mode, when the vehicle is at idle (not in motion), to create a small vibration simulating an idling combustion engine. Thus, the driver can physically detect that the electric scooter or motorbike 100 is ON and ready to be driven.

As illustrated, the traction electric motor 116 includes a shaft 202, which is coupled either directly or indirectly to drive at least one wheel 104b of the electric scooter or motorbike 100. While not illustrated, a transmission (e.g., chain, gears, universal joint) may be employed.

The control circuit 120 may take any of a large variety of forms, and will typically include a controller 204, one or more power converters 206a-206e (five illustrated), and switches and/or sensors $S_{VB}, S_{IB}, S_{VC}, S_{IC}, S_{VM}, S_{IM}, S_{RM}, S_{W}, S_{TH}, S_{K}$.

As illustrated in FIG. 2, the control circuit 120 may include a first DC/DC power converter 206a that, in a drive mode or configuration, couples the electrical energy storage device 118 to supply power to the traction electric motor 116. The first DC/DC power converter 206a may step up a voltage of electrical power from the electrical energy storage device 118 to a level sufficient to drive the traction electric motor 116. The first DC/DC power converter 206a may take a variety of forms, for example an unregulated or regulated switch mode power converter, which may or may not be isolated. For instance, the first DC/DC power converter 206a may take the form of a regulated boost switch mode power converter or buck-boost switch mode power converter.

The control circuit 120 may include a DC/AC power converter 206b, commonly referred to as an inverter, that, in the drive mode or configuration, couples the electrical energy storage device 118 to supply power, via the first DC/DC power converter 206a, to the traction electric motor 116. The DC/AC power converter 206b may invert electrical power from the first DC/DC converter 206a into an AC waveform suitable to drive the traction electric motor 116. The AC wave form may be single phase or multi-phase, for example two or three phase AC power. The DC/AC power converter 206b may take a variety of forms, for example an unregulated or regulated switch mode power converter, which may or may not be isolated. For instance, the DC/AC power converter 206b may take the form of a regulated inverter.

The first DC/DC power converter 206a and the DC/AC power converter 206b are controlled via control signals $C_1$, $C_2$, respectively, supplied via the controller 204. For example, the controller 204, or some intermediary gate drive circuitry, may supply pulse width modulated gate drive signals to control operation of switches (e.g., metal oxide semiconductor field effect transistors or MOSFETs, bipolar insulated gate transistors or IGBTs) of the first DC/DC and/or DC/AC power converters 206a, 206b.

As further illustrated in FIG. 2, the control circuit 120 may include an AC/DC power converter 206c, commonly referred to as a rectifier, that, in an optional braking or regenerative braking mode or configuration, couples the traction electric motor 116 to supply power generated thereby to the electrical energy storage device 118. The AC/DC power converter 206c may rectify an AC waveform produced by the traction electric motor 116 to a DC form suitable to be supplied to the electrical energy storage device 118 and, optionally, other components such as the control circuit 120. The AC/DC power converter 206c may take a variety of forms, for example a full bridge passive diode rectifier or full bridge active transistor rectifier.

The control circuit 120 may also include a second DC/DC power converter 206d that electrically couples the traction electric motor 116 to the electrical energy storage device 118 via the AC/DC power converter 206c. The second DC/DC power converter 206d may step down a voltage of the electrical power generated by the traction electric motor 116 to a level suitable for the electrical energy storage device 118. The second DC/DC power converter 206d may take a variety of forms, for example an unregulated or regulated switch mode power converter, which may or may not be isolated. For instance, the second DC/DC power converter 206d may take the form of a regulated buck switch mode power converter, synchronous buck switch mode power converter, or buck-boost switch mode power converter.

The AC/DC power converter 206c and the second DC/DC power converter 206d are controlled via control signals $C_3$, $C_4$, respectively, supplied via the controller 204. For example, the controller 204, or some intermediary gate drive controller, may supply pulse width modulated gate drive signals to control operation of switches (e.g., MOSFETs, IGBTs) of the AC/DC and/or the second DC/DC power converters 206c, 206d.

Though not illustrated, those skilled in the art will appreciate that the electrical energy storage device 118 may comprise two or more electrical energy storage devices, such as a main electrical energy storage device to supply power to the electric traction motor 116 via the first DC/DC power converter 206a and the DC/AC power converter 206b, and an auxiliary electrical energy storage device to receive power generated by the electric traction motor 116 during an optional regenerative braking operation via the AC/DC power converter 206c and the second DC/DC power converter 206d. In this example, since the auxiliary electrical energy storage device does not drive the traction electric motor 116, greater flexibility may be allowed in selecting its form (e.g., super- or ultracapacitor cells, battery cells).

As further illustrated in FIG. 2, the control circuit 120 may include a third DC/DC power converter 206e that electrically couples the electrical energy storage device 118 to various other components, for example the controller 120, a speaker 208, and a visual indicator 210. The third DC/DC power converter 206e may step down a voltage of the electrical power supplied by the electrical energy storage device 118 to a level suitable for one or more other components. The third DC/DC power converter 206e may take a variety of forms, for example an unregulated or regulated switch mode power converter, which may or may not be isolated. For instance, the third DC/DC power converter 206e may take the form of a regulated buck switch mode power converter, synchronous buck switch mode power converter, or buck-boost switch mode power converter.

As illustrated in FIG. 2, the speaker 208 and the visual indicator 210 may be provided, for example, on a control panel (dashboard) 212 of the electric scooter or motorbike 100. The speaker 208 may be any independent speaker that converts electrical signals into audible signals, or may be part of a media player system provided on the electric scooter or motorbike 100. The visual indicator may be formed of any suitable lighting device, such as a light emitting diode (LED), and may include indicia to indicate that the vehicle is in the standby mode, as will be more fully described below. It should be apparent to one skilled in the art that the locations of the speaker 208 and the visual indicator 210 are not confined to the control panel 212. Rather, the speaker 208 may be arranged at any location as long as the audible signals therefrom are detectible by the driver and, likewise, the visual indicator 210 may be arranged at any location as long as its indication is visually detectible by the driver. The speaker 208 and the visual indicator 210 are controlled via control signals $C_{S1}$, $C_{S2}$, respectively, supplied via the controller 204.

The controller 204 may take a variety of forms which may include one or more integrated circuits, integrated circuit components, analog circuits or analog circuit components. As illustrated, the controller 204 includes a microcontroller 220, non-transitory computer- or processor readable memory such as a read only memory (ROM) 222 and/or random access memory (RAM) 224, and may optionally include one or more gate drive circuits 226.

The microcontroller 220 executes logic to control operation of the power system, and may take a variety of forms. For example, the microcontroller 220 may take the form of a microprocessor, programmed logic controller (PLC), programmable gate array (PGA) such as a field programmable gate array (FPGS), and application specific integrated circuit (ASIC), or other such microcontroller device. The ROM 222 may take any of a variety of forms capable of storing processor executable instructions and/or data to implement the control logic. The RAM 224 may take any of a variety of forms capable of temporarily retaining processor executable instructions or data. The microcontroller 220, ROM 222, RAM 224 and optional gate drive circuit(s) 226 may be coupled by one or more buses (not shown), including power buses, instructions buses, data buses, address buses, etc. Alternatively, the control logic may be implemented in an analog circuit.

The gate drive circuit(s) 226 may take any of a variety of forms suitable for driving switches (e.g., MOSFETs, IGBTs) of the power converters 206 via drive signals (e.g., PWM gate drive signals). While illustrated as part of the controller 204, one or more gate drive circuits may be intermediate the controller 204 and the power converters 206.

The controller 204 may receive signals from one or more sensors $S_{VB}$, $S_{IB}$, $S_{VC}$, $S_{IC}$, $S_{VM}$, $S_{IM}$, $S_{RM}$, $S_W$, $S_{TH}$, $S_K$. The controller may use the sensed information to detect that the electric scooter or motorbike 100 is idling (not in motion), so as to then switch into a standby mode. The standby mode, as used herein, means a third mode of operation of the electric scooter or motorbike 100, in addition to the drive mode, during which power is supplied to the traction electric motor 116 to drive the wheel 104b, and the optional braking mode, during which power is generated by the traction electric motor 116 based on the rotation of the wheel 104b. Specifically, the standby mode means that the electric scooter or motorbike 100 is powered ON but is idling (not in motion). That is, the standby mode means that the electric scooter or motorbike 100 is ready to be driven, but is not currently being driven. The controller 204 may detect that the electric scooter or motorbike 100 is in the idling state (not in motion) based at least in part on any of a sensed throttle position, a sensed electrical characteristic of the electrical energy storage device 118, the power converters 206, and/or the traction electric motor 116, and a sensed rate of rotation of the traction electric motor 116 and/or the wheel 104b, as will be more fully described below.

Once the controller 204 detects that the electric scooter or motorbike 100 is in the idling state, the controller 204 enters into the standby mode and supplies a relatively small amount of power from the electrical energy storage device 118 to the traction electric motor 116 to create a small vibration simulating an idling combustion engine. The driver will then physically feel and detect that the vehicle is powered ON and is in the standby mode (ready to be driven). Such may be accomplished by application of control signals $C_1$, $C_2$ to control supply of an amount of electric power through the first DC/DC power converter 206a and the DC/AC power converter 206b to the traction electric motor 116. The control signals $C_1$, $C_2$ may set a voltage level or current level of the applied power and even a polarity of the applied power. The amount of power to be supplied during the standby mode may be any amount, which is sufficient to create a vibration of the traction electric motor 116 that is physically detectible by the driver of the electric scooter or motorbike 100, but which may not sufficient to actuate the wheel 104b coupled to the electric motor 116. As an alternative to supplying electrical power to the traction electric motor 116 to produce vibration detectible by the driver/user, when the controller 204 detects that the electric scooter or motorbike is in the idling state, the controller may cause the supply a relatively small amount of power from the electrical energy storage device 118 to a vibration device 117 to create the vibration detectible by the driver. Utilization of a source of vibration different from the traction electric motor removes any need to ensure the power supplied to the traction electric motor to create the vibration is insufficient to actuate movement of the wheel coupled to the motor.

To further ensure that the driver is made aware that the electric scooter or motorbike 100 is in the standby mode and is ready to be driven, the controller 204 may additionally send the control signal $C_{S1}$ to the speaker 208 and/or send the control signal $C_{S2}$ to the visual indicator 210. The audible signals from the speaker 208 and/or the visual indication based on the visual indicator 210, in addition to the small vibration of the traction electric motor 116, may all serve to alert the driver that the electric scooter or motorbike 100 is in the standby mode. The visual indicator 210 may issue continuous visual signals or blinking visual signals, the intensity and/or interval of which may be readily controlled by the control signals $C_{S2}$.

In addition to sensing and determining that the electric vehicle, e.g., scooter or motorbike, is in the standby mode, movement of the scooter or motorbike can be determined and tactile, audible, and/or visual signals can be generated to alert the driver to the movement and/or simulate the tactile feeling and audible sound that occurs when a combustion powered scooter or motorbike are moved in the same way as the detected movement. For example, when the driver is rocking the electric scooter forward and backward by engaging and disengaging the throttle, a tactile and audio signal simulating the feel (e.g., vibration of vehicle) and sound (e.g., revving) of rocking an internal combustion powered scooter or motorbike back and forth can be produced by the control circuit 120. The movement of the scooter or motorbike is detected in the same manner described above for detecting the idling state. The tactile and audio output when movement of the scooter or motorbike is detected is produced in the same manner as the vibration and audio output produced when the idling state is detected. The tactile and audio output corresponding to movement of the scooter or motorbike would be created as soon as such movement is detected. By doing so, the tactile and audio output is synchronized with movement of the scooter or motorbike, which results in a richer user experience. The vibration and audio output generated in response to detecting movement of the scooter or motorbike maybe different from the vibration and audio signal produced by the control circuit when it detects the idling mode. For example, when movement of the scooter or motorbike is detected, the tactile and audio output can be similar to the tactile and audio output produced when a internal combustion powered scooter or motorbike is moved in the same way. For example, when the throttle is engaged and moved in a way to accelerate or decelerate the scooter or motorbike, the audio signal can be similar to the sound the occurs when an internal combustion powered scooter is accelerating or decelerating.

Various sensors that may be used to detect that the electric scooter or motorbike 100 is in an idling state are next described in detail.

A battery voltage sensor $S_{VB}$ may be positioned to sense a voltage across the electrical power storage device 118 and provide signals $V_B$ indicative of the sensed voltage.

A battery charge sensor $S_{IB}$ may be positioned to sense a charge of the electrical power storage device 118 and provide signals $I_B$ indicative of the sensed charge.

A power converter voltage sensor $S_{VC}$ may be positioned to sense a voltage across one or more of the power converters 206 and provide signals $V_C$ indicative of the sensed voltage.

A power converter charge sensor $S_{IC}$ may be positioned to sense a charge through one or more of the power converters 206 and provide signals $I_C$ indicative of the sensed charge.

A traction motor voltage sensor $S_{VM}$ may be positioned to sense a voltage across the traction electric motor 116 and provide signals $V_M$ indicative of the sensed voltage.

A traction motor current sensor $S_{IM}$ may be positioned to sense a current flow through the traction electric motor 116 and provide signals $I_M$ indicative of the sensed current.

A traction motor rotational sensor $S_{RM}$ may be positioned to sense a rate of rotation of the traction motor 116 and provide signals RPM(M) indicative of the sensed rotational speed.

A wheel rotational sensor $S_W$ may be positioned to sense a rate of rotation of the wheel 104b or other wheel and provide signals RPM(W) indicative of the sensed rotational speed.

A throttle position sensor $S_{TH}$ may be positioned to sense a position of the throttle 108 of the electric scooter or motorbike 100 and provide signals P indicative of the sensed throttle position.

A key sensor $S_K$ may be positioned to sense whether a key 109 is received (e.g., inserted in a key slot or placed in proximity to the electronic scooter or motor vehicle 100) to power ON the electric scooter or motorbike 100 and provide signals O indicative of the sensed key-on (power ON) state.

As discussed herein, the controller 204 can use one or more of the sensed conditions to control operation of the traction electric motor 116 (to create a small vibration), the speaker 208 (to issue an audible alarm), and/or the visual indicator 210 (to issue a visual alarm) to alert the driver that the electric scooter or motorbike 100 is ON in the standby mode and is ready to be driven. In other embodiments, controller 204 can use one or more of the sensed conditions to control operation of the vibration device 117, speaker 208, and/or visual indicator 210 to provide tactile, audio and/or visual feedback corresponding to the detected condition.

Figure 3:
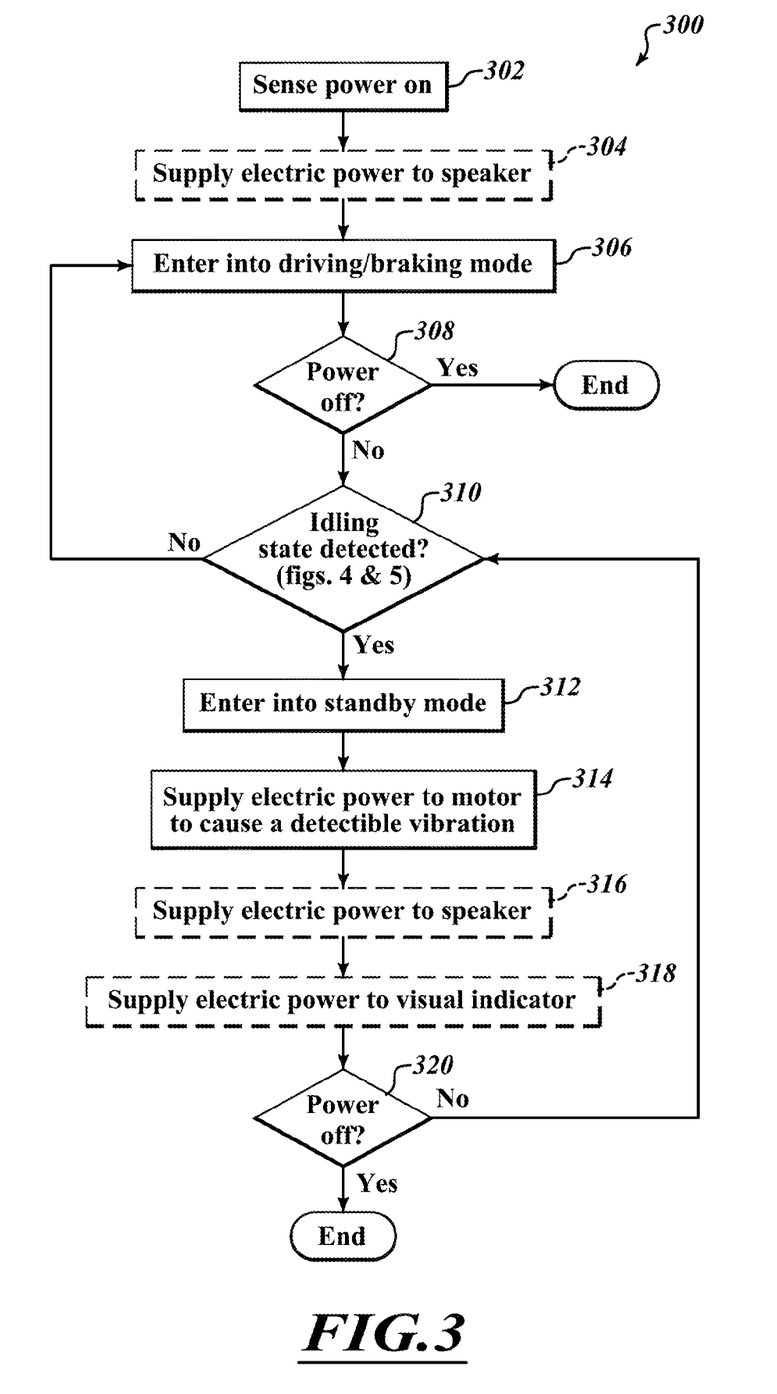
FIG. 3 is a flow diagram showing a high level method of operating the components or structures of FIG. 2 to provide a detectible indication to a driver that an electric vehicle is in a standby mode (i.e., ready to be driven), according to one non-limiting illustrated embodiment.

FIG. 3 shows a high level method 300 of operating the components or structures of FIG. 2 to provide a detectible indication that an electric vehicle is in the standby mode (i.e., powered ON and ready to be driven), according to one non-limiting illustrated embodiment.

At 302, it is sensed that the electric scooter or motorbike 100 is powered ON based on, for example, the signals O that indicate that the driver has turned a key or otherwise powered ON the scooter or motorbike 100.

At 304, at this time immediately after the power ON, the controller 204 may send control signals $C_{S1}$ to the speaker 208 to have electric power supplied from the electrical energy storage device 118 through the third DC/DC power converter 206e thereto, to thereby issue audible signals alerting the driver that the electric scooter or motorbike 100 is ON and is ready to be driven.

At 306, the controller 204 enters into a drive mode (or driving/braking mode if an optional regenerative braking mode is used) and based on the driver's instruction (e.g., via the throttle 108) to drive the electric scooter or motorbike 100, supplies power from the electrical power storage device 118 to the traction electric motor 116 to drive the wheel 104b. When the driver applies the brake levers 110, the controller 204 may then enter into a braking mode, in which the power generated by the traction electric motor 116 is supplied to the electrical power storage device 118. Thus, the driving/braking mode as used herein is a higher-level mode of operation, which includes the drive mode and the braking mode as two sub-modes thereof. As used herein, during both the drive mode (when the braking mode is not used) and the driving/braking mode, the driver is actively operating the scooter or motorbike 100 and therefore is expected to be fully aware that the scooter or motorbike 100 is powered ON. Nonetheless, as described above, in certain embodiments, when the scooter or motorbike 100 is being actively operated, control circuit 120 controls a vibration device 117, speaker 208 and/or visual indicator 210 to provide outputs that simulate the vibration, sound or sight a driver encounters when an internal combustion powered scooter or motorbike are moving in the same manner.

At 308, it is sensed whether the electric scooter or motorbike 100 is powered OFF based on, for example, the signals O that indicate that the driver has removed the key or otherwise powered OFF the scooter or motorbike 100. If a power OFF is sensed, then the control logic of the method ends.

At 310, it is detected whether the electric scooter or motorbike 100 is in an idling state. Some non-limiting examples of how to detect the idling state will be described in detail in reference to FIGS. 4 and 5 below. Unless the idling state is detected, the controller 204 remains in the drive mode (or in the driving/braking mode if the braking mode is used).

At 312, after it is detected that the electric scooter or motorbike 100 is in an idling state, the controller 204 enters into the standby mode. As discussed above, during the standby mode, the controller 204 operates to issue one or more types of indications detectible to the driver, to thereby alert the driver that the electric scooter or motorbike 100 is powered ON and is ready to be driven.

At 314, an amount of electric power is supplied from the electrical energy storage device 118 to the traction electric motor 116 to create a small vibration detectible to the driver. This may be accomplished by application of control signals $C_1$, $C_2$ to control the supply of an amount of electric power from the electrical energy storage device 118 through the first DC/DC power converter 206a and the DC/AC power converter 206b to the traction electric motor 116. As discussed above, the control signals $C_1$, $C_2$ may set a voltage level or current level of the applied power.

At 316, optionally, the controller 204 may send the control signal $C_{S1}$ to the speaker 208 to have electric power supplied from the electrical energy storage device 118 through the third DC/DC power converter 206e thereto, to thereby issue audible signals to alert the driver that the electric scooter or motorbike 100 is ON and is in the standby mode (ready to be driven).

At 318, further optionally, the controller 204 may send the control signal $C_{S2}$ to the visual indicator 210 to have electric power supplied from the electrical energy storage device 118 through the third DC/DC power converter 206e thereto, to thereby issue visual signals to alert the driver that the electric scooter or motorbike 100 is in the standby mode.

The foregoing sensors can also be used to sense motion of the scooter or motorbike and determine the scooter or motorbike is in a moving state, whereby the scooter or motorbike is not in the idle or OFF state and is moving.

At 320, it is sensed whether the electric scooter or motorbike 100 is powered OFF based on, for example, the signals O that indicate that the driver has removed the key or otherwise powered OFF the scooter or motorbike 100. If a power OFF is sensed, then the control logic of the method ends.

If a power OFF is not detected, then the control logic returns to 310, and it is again detected whether the electric scooter or motorbike 100 is in an idling state. As long as the electric scooter or motorbike remains in an idling state, it remains in the standby mode, and the one or more types of detectible indications of the standby mode continue to be issued. Various further arrangements are possible with the one or more types of detectible indications, such as that an amount of vibration, volume of the audio signals, or intensity of the visual signals may increase pursuant to the passage of time during which the electric scooter or motorbike 100 remains in the standby mode. As another example, when the visual indicator 210 issues blinking visual signals, the blinking interval may be made shorter pursuant to the passage of time. Still further, the visual indicator 210 may include a numeric indication of a period of time that the electric scooter or motorbike 100 has remained in the standby mode. For example, numeric indicia, "00:02:12," will indicate to the driver that the electric scooter or motorbike 100 has been in the standby mode for 2 minutes and 12 seconds.

On the other hand, if it is detected that the electric scooter or motorbike 100 is no longer in an idling state (e.g., when the driver operates the throttle 108 to drive the electric scooter or motorbike 100), the controller 204 leaves the standby mode and returns to 306 to re-enter the drive mode (or the driving/braking mode).

Figure 4:
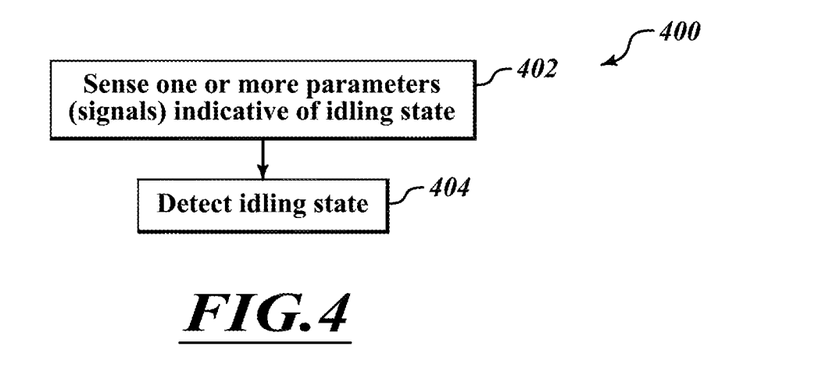
FIG. 4 is a flow diagram showing a low level method of operating the components or structures of FIG. 2 to detect that a vehicle is in an idling state based on one or more sensed parameters, according to one non-limiting embodiment.

FIG. 4 shows a low level method 400 of operating the components or structures of FIG. 2 to detect that the electric scooter or motorbike 100 is in an idling state (or not) based on one or more sensed parameter signals provided from the one or more sensors $S_{VB}$, $S_{IB}$, $S_{VC}$, $S_{IC}$, $S_{VM}$, $S_{IM}$, $S_{RM}$, $S_W$, $S_{TH}$.

At 402, the controller 204 receives/senses one or more of the parameter signals $V_B$, $I_B$, $V_C$, $I_C$, $V_M$, $I_M$, RPM(M), RPM(W), P provided by the one or more sensors $S_{VB}$, $S_{IB}$, $S_{VC}$, $S_{IC}$, $S_{VM}$, $S_{IM}$, $S_{RM}$, $S_W$, $S_{TH}$, respectively.

At 404, the controller 204 detects (determines) that the electric scooter or motorbike 100 is in an idling state (or not) based at least in part on one or more of these parameter signals $V_B$, $I_B$, $V_C$, $I_C$, $V_M$, $I_M$, RPM(M), RPM(W), P provided by the one or more of these sensors.

For example, the signals RPM(M) (the rate of rotation of the traction electric motor 116) and/or the signals RPM(W) (the rate of rotation of the wheel 104b) may alone or together with other parameters indicate that the electric scooter or motorbike 100 is not in motion and thus is in an idling state. Alternatively, the signals RPM(M) and/or the signals RPM (W) may alone or together with other parameters indicate that the electric scooter or motorbike 100 is in motion and not in an idling state.

As another example, the signals P indicate a position of the throttle 108 and, thus, may provide one indication of the driver's intent to place the electric scooter or motorbike 100 in idle, i.e., an indication that the electric scooter or motorbike 100 is in an idling state or not. If the driver places the throttle 108 in a position indicative of zero power being supplied to the traction electric motor 116 at the same time when the electric scooter or motorbike 100 is not in motion or close to being not in motion, as indicated by zero rotational speed indicated by the signals RPM(M) and/or RPM(W), the controller 204 may determine that the electric scooter or motorbike 100 is in an idling state. Alternatively, the signals P may provide an indication that the electric scooter or motorbike 100 is in motion and not in an idling state.

As yet another example, any one or more of the signals $V_B$ (voltage across the main electrical power storage device 118), $I_B$ (current through the main electrical power storage device 118), $V_C$ (voltage across one or more of the power converters 206), $I_C$ (current through one or more of the power converters 206), $V_M$ (voltage across the traction electric motor 116), and $I_M$ (current through the traction electric motor 116) being zero or close to zero or at or near a defined value (e.g., below a minimum threshold), alone or in combination with other parameters (e.g., P, RPM(M), RPM(W)) may indicate that the electric scooter or motorbike 100 is in an idling state or not. For example, one or more of the signals $V_B$ (voltage across the main electrical power storage device 118), $I_B$ (current through the main electrical power storage device 118), $V_C$ (voltage across one or more of the power converters 206), $I_C$ (current through one or more of the power converters 206), $V_M$ (voltage across the traction electric motor 116), and $I_M$ (current through the traction electric motor 116), alone or in combination with other parameters (e.g., P, RPM(M), RPM(W)) may provide an indication the electric scooter or motorbike 100 is in motion and not in an idling state.

Figure 5:
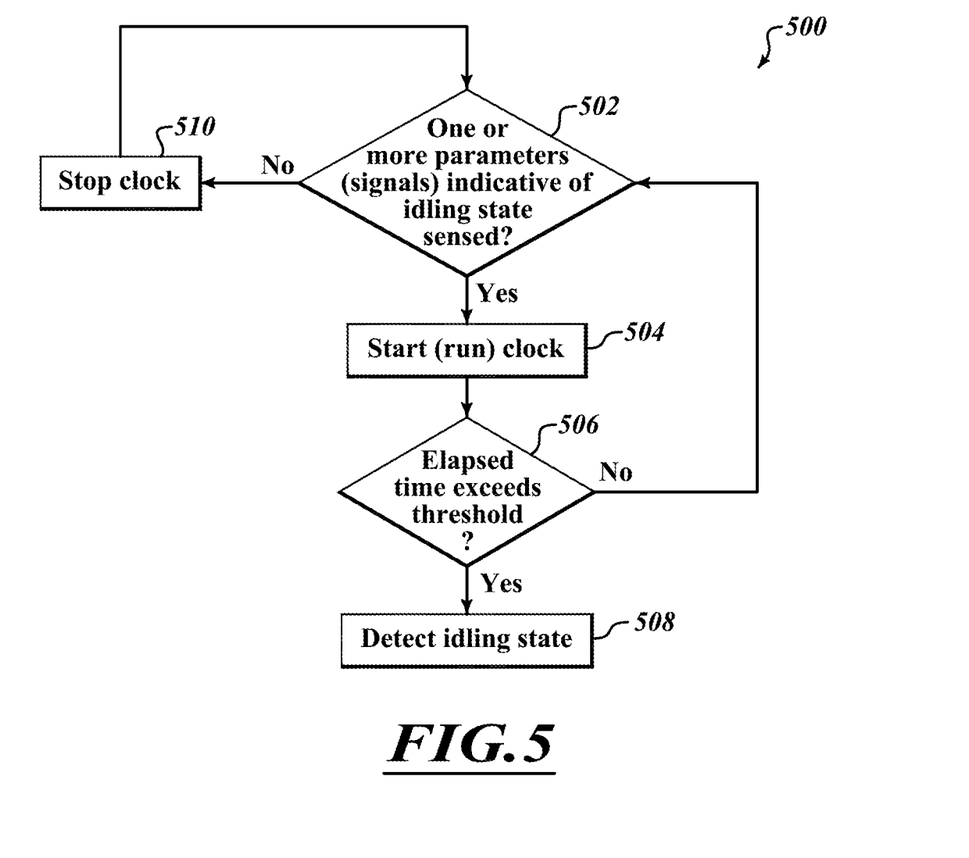
FIG. 5 is a flow diagram showing another low level method of operating the components or structures of FIG. 2 to detect that a vehicle is in an idling state based on one or more sensed parameters, according to one non-limiting embodiment.

FIG. 5 shows another low-level method 500 of operating the components or structures of FIG. 2 to detect that the electric scooter or motorbike 100 is in an idling state or in motion based on one or more sensed parameter signals provided by one or more sensors $S_{VB}$, $S_{IB}$, $S_{VC}$, $S_{IC}$, $S_{VM}$, $S_{IM}$, $S_{RM}$, $S_W$, $S_{TH}$, respectively.

At 502, the controller 204 receives/senses one or more of the parameter signals $V_B$, $I_B$, $V_C$, $I_C$, $V_M$, $I_M$, RPM(M), RPM(W), P from the one or more sensors $S_{VB}$, $S_{IB}$, $S_{VC}$, $S_{IC}$, $S_{VM}$, $S_{IM}$, $S_{RM}$, $S_W$, $S_{TH}$, respectively.

At 504, the controller 204 starts a clock therein or coupled thereto (not separately illustrated) so as to measure an elapsed period of time.

For example, when the signals RPM(M) (the rate of rotation of the traction electric motor 116) and/or the signals RPM(W) (the rate of rotation of the wheel 104b) indicative of zero or close to zero rate of rotation are received at 502, the clock is initiated at 504.

As another example, when the signals P indicative of zero power being supplied to the traction electric motor 116 are received alone or in combination with other parameter signals at 502, the clock is initiated at 504.

As yet another example, when any one or more of the signals $V_B$ (voltage across the main electrical power storage device 118), $I_B$ (current through the main electrical power storage device 118), $V_C$ (voltage across one or more of the power converters 206), $I_C$ (current through one or more of the power converters 206), $V_M$ (voltage across the traction electric motor 116), $I_M$ (current through the traction electric motor 116) being zero or close to zero or at or near a defined value (below a minimum threshold), alone or in combination with other parameter signals (e.g., P, RPM(M), RPM(W)), are received at 502, the clock is initiated at 504.

At 506, it is determined whether the elapsed time measured by the clock has exceeded a threshold period of time. For example, when the clock was initiated based on receipt of the signals RPM(M) and/or RPM(W) indicating zero or close to zero rate of rotation, the threshold period of time may be set sufficiently long (e.g., 5-15 seconds) to reliably indicate the idling state of the electric scooter or motorbike 100. The threshold period of time may be set also as a time period that is sufficiently long such that the driver, who has not been in motion for that period of time, may forget that the electric scooter or motorbike 100 is still ON and ready to be driven.

At 508, the controller 204 detects (determines) that the electric scooter or motorbike 100 is in an idling state based on the determination that the threshold period of time has elapsed at 506.

If at 506 it is determined that the elapsed time has not exceeded the threshold value, the control logic returns to 502 and determines whether the one or more parameters indicative of the idling state of the electric scooter or motorbike 100 are sensed. If so, at 504, the control logic lets the clock continue to run and at 506 again determines whether the elapsed time has exceeded the threshold value.

If at 502 it is determined that one or more parameters indicative of the idling state of the electric scooter or motorbike 100 are not sensed, that is, if it is detected that the electric scooter or motorbike 100 is not in an idling state (e.g., when the driver operates the throttle 108 to drive the electric scooter or motorbike 100), the control logic stops the clock at 510. The control logic then waits until one or more parameters indicative of idling state are sensed, at 502.

The method of FIG. 5 may be advantageous when it is useful to monitor one or more of the received parameter signals $V_B$, $I_B$, $V_C$, $I_C$, $V_M$, $I_M$, RPM(M), RPM(W) and P over a period of time, so as to more reliably detect that the electric scooter or motorbike 100 is in an idling state.

As should be apparent to one skilled in the art, use of one or more sensed parameter signals $V_B$, $I_B$, $V_C$, $I_C$, $V_M$, $I_M$, RPM(M), RPM(W), P, with or without use of a clock, to detect the idling state of the electric scooter or motorbike 100 are not limited to those specific examples described above, and any other combinations of parameter signals as well as use of additional parameter signals indicative of the idling state are within the purview of the present invention. For example, secondary parameters may be prepared based on one or more of the sensed parameter signals $V_B$, $I_B$, $V_C$, $I_C$, $V_M$, $I_M$, RPM(M), RPM(W), P, and used either alone or in any combination with other parameters to detect the idling state. For example, secondary parameters that are indicative of changes over time of these parameters signals may be prepared, and termed $V_{B\Delta}$, $I_{B\Delta}$, $V_{C\Delta}$, $I_{C\Delta}$, $V_{M\Delta}$, $I_{M\Delta}$, RPM(M)$\Delta$, RPM(W)$\Delta$, P$\Delta$, respectively. These secondary parameters, which are each indicative of a rate of change of the respective parameter signal, may be useful for reliably detecting whether the electric scooter or motorbike 100 is in an idling state.

The various methods described herein may include additional acts, omit some acts, and/or may perform the acts in a different order than set out in the various flow diagrams.

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via one or more microcontrollers. However, those skilled in the art will recognize that the embodiments disclosed herein, in whole or in part, can be equivalently implemented in standard integrated circuits (e.g., Application Specific Integrated Circuits or ASICs), as one or more computer programs executed by one or more computers (e.g., as one or more programs running on one or more computer systems), as one or more programs executed by on one or more controllers (e.g., microcontrollers) as one or more programs executed by one or more processors (e.g., microprocessors), as firmware, or as virtually any combination thereof, and that designing the circuitry and/or writing the code for the software and/or firmware would be well within the skill of one of ordinary skill in the art in light of the teachings of this disclosure.

When logic is implemented as software and stored in memory, logic or information can be stored on any non-transitory computer-readable medium for use by or in connection with any processor-related system or method. In the context of this disclosure, a memory is a nontransitory computer- or processor-readable storage medium that is an electronic, magnetic, optical, or other physical device or means that non-transitorily contains or stores a computer and/or processor program. Logic and/or the information can be embodied in any computer-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "computer-readable medium" can be any physical element that can store the program associated with logic and/or information for use by or in connection with the instruction execution system, apparatus, and/or device. The computer-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), and digital tape.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet, including but not limited to: U.S. provisional patent application Ser. No. 61/511,900, entitled "APPARATUS, METHOD AND ARTICLE FOR COLLECTION, CHARGING AND DISTRIBUTING POWER STORAGE DEVICES, SUCH AS BATTERIES" and filed Jul. 26, 2011; U.S. provisional patent application Ser. No. 61/647,936 entitled "APPARATUS, METHOD AND ARTICLE FOR COLLECTION, CHARGING AND DISTRIBUTING POWER STORAGE DEVICES, SUCH AS BATTERIES" and filed May 16, 2012; U.S. patent application Ser. No. 13/559,314 entitled "APPARATUS, METHOD AND ARTICLE FOR COLLECTION, CHARGING AND DISTRIBUTING POWER STORAGE DEVICES, SUCH AS BATTERIES" and filed Jul. 26, 2012; U.S. provisional patent application Ser. No. 61/534,753 entitled "APPARATUS, METHOD AND ARTICLE FOR REDISTRIBUTING POWER STORAGE DEVICES, SUCH AS BATTERIES, BETWEEN COLLECTION, CHARGING AND DISTRIBUTION MACHINES" and filed Sep. 14, 2011; U.S. patent application Ser. No. 13/559,091 entitled "APPARATUS, METHOD AND ARTICLE FOR REDISTRIBUTING POWER STORAGE DEVICES, SUCH AS BATTERIES, BETWEEN COLLECTION, CHARGING AND DISTRIBUTION MACHINES" and filed Jul. 26, 2012; U.S. provisional patent application Ser. No. 61/534,761 entitled "APPARATUS, METHOD AND ARTICLE FOR AUTHENTICATION, SECURITY AND CONTROL OF POWER STORAGE DEVICES SUCH AS BATTERIES" and filed Sep. 14, 2011, U.S. patent application Ser. No. 13/559,038 entitled "APPARATUS, METHOD AND ARTICLE FOR AUTHENTICATION, SECURITY AND CONTROL OF POWER STORAGE DEVICES SUCH AS BATTERIES" and filed Jul. 26, 2012; U.S. provisional patent application Ser. No. 61/534,772 entitled "APPARATUS, METHOD AND ARTICLE FOR AUTHENTICATION, SECURITY AND CONTROL OF POWER STORAGE DEVICES, SUCH AS BATTERIES, BASED ON USER PROFILES" and filed Sep. 14, 2011; U.S. patent application Ser. No. 13/559,010 entitled "APPARATUS, METHOD AND ARTICLE FOR AUTHENTICATION, SECURITY AND CONTROL OF POWER STORAGE DEVICES, SUCH AS BATTERIES, BASED ON USER PROFILES" and filed Jul. 26, 2012; U.S. provisional patent application Ser. No. 61/543,720, entitled "DETECTIBLE INDICATION OF AN ELECTRIC MOTOR VEHICLE STANDBY MODE," and filed Oct. 5, 2011; U.S. provisional patent application Ser. No. 61/684,432, entitled "DETECTIBLE INDICATION OF AN ELECTRIC MOTOR VEHICLE STANDBY MODE," and filed Aug. 17, 2012; U.S. provisional patent application Ser. No. 61/511,887, entitled "THERMAL MANAGEMENT OF COMPONENTS IN ELECTRIC MOTOR DRIVE VEHICLES" and filed Jul. 26, 2011; U.S. provisional patent application Ser. No. 61/647,941 entitled "THERMAL MANAGEMENT OF COMPONENTS IN ELECTRIC MOTOR DRIVE VEHICLES" and filed May 16, 2012; U.S. patent application Ser. No. 13/559,259 entitled "THERMAL MANAGEMENT OF COMPONENTS IN ELECTRIC MOTOR DRIVE VEHICLES" and filed Jul. 26, 2012; U.S. provisional patent application Ser. No. 61/511,880, entitled "DYNAMICALLY LIMITING VEHICLE OPERATION FOR BEST EFFORT ECONOMY" and filed Jul. 26, 2011; U.S. patent application Ser. No. 13/559,264, entitled "DYNAMICALLY LIMITING VEHICLE OPERATION FOR BEST EFFORT ECONOMY" and filed Jul. 26, 2012; U.S. provisional patent application Ser. No. 61/557,170 entitled "APPARATUS, METHOD, AND ARTICLE FOR PHYSICAL SECURITY OF POWER STORAGE DEVICES IN VEHICLES" and filed Nov. 8, 2011; U.S. patent application Ser. No. 13/559,054 entitled "APPARATUS, METHOD AND ARTICLE FOR PHYSICAL SECURITY OF POWER STORAGE DEVICES IN VEHICLES" and filed Jul. 26, 2012; U.S. provisional patent application Ser. No. 61/557,176 entitled "APPARATUS, METHOD AND ARTICLE FOR SECURITY OF VEHICLES" and filed Nov. 8, 2011; U.S. provisional patent application Ser. No. 61/581,566 entitled "APPARATUS, METHOD AND ARTICLE FOR A POWER STORAGE DEVICE COMPARTMENT" and filed Dec. 29, 2011; U.S. patent application Ser. No. 13/559,125 entitled "APPARATUS, METHOD AND ARTICLE FOR A POWER STORAGE DEVICE COMPARTMENT" and filed Jul. 26, 2012; U.S. provisional patent application Ser. No. 61/601,404 entitled "APPARATUS, METHOD AND ARTICLE FOR PROVIDING VEHICLE DIAGNOSTIC DATA" and filed Feb. 21, 2012; U.S. patent application Ser. No. 13/559,390 entitled "APPARATUS, METHOD AND ARTICLE FOR PROVIDING VEHICLE DIAGNOSTIC DATA" and filed Jul. 26, 2012; U.S. provisional patent application Ser. No. 61/601,949 entitled "APPARATUS, METHOD AND ARTICLE FOR PROVIDING LOCATIONS OF POWER STORAGE DEVICE COLLECTION, CHARGING AND DISTRIBUTION MACHINES" and filed Feb. 22, 2012; U.S. patent application Ser. No. 13/559,333 entitled "APPARATUS, METHOD AND ARTICLE FOR PROVIDING LOCATIONS OF POWER STORAGE DEVICE COLLECTION, CHARGING AND DISTRIBUTION MACHINES" and filed Jul. 26, 2012; U.S. provisional patent application Ser. No. 61/601,953 entitled "APPARATUS, METHOD AND ARTICLE FOR PROVIDING INFORMATION REGARDING AVAILABILITY OF POWER STORAGE DEVICES AT A POWER STORAGE DEVICE COLLECTION, CHARGING AND DISTRIBUTION MACHINE" and filed Feb. 22, 2012; U.S. patent application Ser. No. 13/559,343 entitled "APPARATUS, METHOD AND ARTICLE FOR PROVIDING INFORMATION REGARDING AVAILABILITY OF POWER STORAGE DEVICES AT A POWER STORAGE DEVICE COLLECTION, CHARGING AND DISTRIBUTION MACHINE" and filed Jul. 26, 2012; and U.S. patent application Ser. No. 13/559,064 entitled "APPARATUS, METHOD AND ARTICLE FOR RESERVING POWER STORAGE DEVICES AT RESERVING POWER STORAGE DEVICE COLLECTION, CHARGING AND DISTRIBUTION MACHINES" and filed on Jul. 26, 2012 are incorporated herein by reference, in their entirety. Aspects of the embodiments can be modified, if necessary, to employ systems, circuits and concepts of the various patents, applications and publications to provide yet further embodiments.

While generally discussed in the environment and context of power systems for use with personal transportation vehicles such as all-electric scooters and/or motorbikes, the teachings herein can be applied in a wide variety of other environments, including other vehicular environments The above description of illustrated embodiments, including what is described in the Abstract, is not intended to be exhaustive or to limit the embodiments to the precise forms disclosed. Although specific embodiments and examples are described herein for illustrative purposes, various equivalent modifications can be made without departing from the spirit and scope of the disclosure, as will be recognized by those skilled in the relevant art.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

We claim:

1. A vehicle, comprising:
a traction electric motor coupled to directly drive at least one traction wheel of the vehicle;
an electrical power storage device that stores electric power;
one or more idling state sensors positioned to sense an idling state of the vehicle; and
a controller that receives input from the one or more idling state sensors and controls supply of electric power from the electric power storage device to the traction electric motor, the controller after determining the vehicle is in the idling state, controls supply of a first amount of electric power from the electrical power storage device to the traction electric motor based at least in part on the sensed idling state of the vehicle, the first amount of electrical energy being sufficient to create vibration of the traction electric motor detectible by a user and insufficient to cause the vehicle to exit the idling state.

2. The vehicle of claim 1 wherein the controller applies control signals to supply a first amount of current to the traction electric motor based at least in part on the sensed idling state of the vehicle.

3. The vehicle of claim 1 wherein the controller applies control signals to supply a first amount of voltage to the traction electric motor based at least in part on the sensed idling state of the vehicle.

4. The vehicle of claim 1, wherein the traction electric motor is the only motor coupled to directly drive the at least one traction wheel of the vehicle.

5. The vehicle of claim 1, wherein the vehicle is an all-electric vehicle.

6. A power system for a vehicle, the system comprising:
a traction electric motor coupled to directly drive at least one traction wheel of the vehicle;
an electrical energy storage device to drive the traction electric motor; and
a control circuit that includes at least one idling state sensor arranged to sense an idling state of the vehicle and control supply of electric power from the electrical energy storage device to the traction electric motor, wherein after sensing the vehicle is in the idling state, the control circuit causes the electrical energy storage device to supply a first amount of electric power to the traction electric motor based at least in part on the sensed idling state of the vehicle, the first amount of electrical energy being sufficient to create vibration of the traction electric motor detectible by a user and insufficient to cause the vehicle to exit the idling state.

7. The power system of claim 6, further comprising a speaker, wherein the control circuit further causes the electrical energy storage device to supply a second amount of electric power to the speaker based at least in part on the sensed idling state of the vehicle to issue an audible indication.

8. The power system of claim 7 wherein the control circuit includes a power-on sensor to sense a power-on state of the vehicle, wherein the control circuit causes the electrical energy storage device to supply the second amount of electric power to the speaker based at least in part on the sensed power-on state of the vehicle.

9. The power system of claim 6 wherein the at least one idling state sensor is a rotation sensor coupled to sense a rate of rotation of a drive shaft of the traction electric motor, wherein the control circuit causes supply of the first amount of electric power to the fraction electric motor based at least in part on the sensed rate of rotation of the traction electric motor.

10. The power system of claim 6 wherein the at least one idling state sensor is a rotation sensor coupled to sense a rate of rotation of the at least one traction wheel of the vehicle, wherein the control circuit causes supply of the first amount of electric power to the traction electric motor based at least in part on the sensed rate of rotation of the at least one traction wheel.

11. The power system of claim 6 wherein the at least one idling state sensor is a throttle position sensor configured to sense a throttle position, wherein the control circuit causes supply of the first amount of electric power to the traction electric motor based at least in part on the sensed throttle position.

12. The power system of claim 6 wherein the at least one idling state sensor is at least one of a voltage sensor or a current sensor coupled to sense at least one electrical characteristic of the electrical energy storage device, wherein the control circuit causes supply of the first amount of electric power to the fraction electric motor based at least in part on the sensed electrical characteristic of the electrical energy storage device.

13. The power system of claim 6, further comprising one or more power converters arranged between the electrical energy storage device and the traction electric motor, wherein the at least one idling state sensor is at least one of a voltage sensor or a current sensor coupled to sense at least one electrical characteristic of the one or more power converters, and wherein the control circuit causes supply of the first amount of electric power to the traction electric motor based at least in part on the sensed electrical characteristic of the one or more power converters.

14. The power system of claim 6 wherein the at least one idling state sensor is at least one of a voltage sensor or a current sensor coupled to sense at least one electrical characteristic of the traction electric motor, wherein the control circuit causes supply of the first amount of electric power to the traction electric motor based at least in part on the sensed electrical characteristic of the traction electric motor.

15. The power system of claim 6 wherein the first amount of electric power to be supplied to the traction electric motor is predefined to cause a vibration of the traction electric motor detectable by a driver.

16. The power system of claim 6, further comprising a visual indicator, wherein the control circuit further causes the electrical energy storage device to supply a third amount of electric power to the visual indicator based at least in part on the sensed idling state of the vehicle to issue a visual indication.

17. The power system of claim 6, wherein the traction electric motor is the only motor coupled to directly drive the at least one traction wheel of the vehicle.

18. The power system of claim 6, wherein the vehicle is an all-electric vehicle.

* * * * *